United States Patent
Li et al.

(10) Patent No.: US 8,289,732 B2
(45) Date of Patent: Oct. 16, 2012

(54) CONTROLLER FOR SWITCHING POWER CONVERTER DRIVING BJT BASED ON PRIMARY SIDE ADAPTIVE DIGITAL CONTROL

(75) Inventors: Yong Li, San Jose, CA (US); Jun Zheng, Shenzhen (CN); Junjie Zheng, Santa Clara, CA (US); John William Kesterson, San Jose, CA (US)

(73) Assignee: iWatt Inc., Campbell, CA (US)

( * ) Notice: Subject to any disclaimer, the term of this patent is extended or adjusted under 35 U.S.C. 154(b) by 337 days.

(21) Appl. No.: 12/639,399

(22) Filed: Dec. 16, 2009

(65) Prior Publication Data

US 2010/0157636 A1    Jun. 24, 2010

Related U.S. Application Data

(60) Provisional application No. 61/140,605, filed on Dec. 23, 2008.

(51) Int. Cl.
*H02M 3/335* (2006.01)
(52) U.S. Cl. .................................. 363/21.12; 363/21.16
(58) Field of Classification Search .................... 363/20, 363/21.01, 21.04, 21.08, 21.12, 21.16, 124
See application file for complete search history.

(56) References Cited

U.S. PATENT DOCUMENTS

| | | | |
|---|---|---|---|
| 5,517,397 A | 5/1996 | Quek et al. | |
| 6,927,989 B2 * | 8/2005 | Fukumoto | 363/95 |
| 7,388,360 B2 * | 6/2008 | Baurle et al. | 323/284 |
| 7,443,700 B2 | 10/2008 | Yan et al. | |
| 2008/0025054 A1 * | 1/2008 | Yang et al. | 363/56.01 |
| 2008/0031021 A1 * | 2/2008 | Ros et al. | 363/46 |
| 2008/0112193 A1 | 5/2008 | Yan et al. | |
| 2008/0180973 A1 * | 7/2008 | Park et al. | 363/21.01 |

OTHER PUBLICATIONS

PCT International Search Report and Written Opinion, PCT Application No. PCT/US2009/068708, Mar. 3, 2010, eight pages.
iWatt, Inc., "iW1689: Low-Power Off-line Digital PWM Controller," May 16, 2008, pp. 1-2 and 16-17, Los Gatos, California.
iWatt, Inc., "iW1690: Low-Power Off-line Digital PWM Controller," May 23, 2008, pp. 1-2 and 11-12, Los Gatos, California.
iWatt, Inc., "iW1692: Low-Power Off-line Digital PWM Controller," Nov. 20, 2007, pp. 1-2 and 17-18, Los Gatos, California.

* cited by examiner

*Primary Examiner* — Adolf Berhane
*Assistant Examiner* — Emily Pham
(74) *Attorney, Agent, or Firm* — Fenwick & West LLP

(57) ABSTRACT

A controller of an AC/DC flyback switching power supply uses adaptive digital control approaches to control the switching operation of a BJT power switch based on primary-side feedback to regulate the secondary-side constant output voltage and output current, without using the input line voltage. Switching-cycle by switching-cycle peak current control and limit are achieved based on the sensed primary-side current rather than the input line voltage in both constant-voltage and constant-current modes, operating in PWM, PFM and/or combinations of a plurality of PWM and PFM modes. The controller IC does not need a separate pin and ADC circuitry for sensing the input line voltage. The controller IC directly drives the BJT base, and dynamically adjusts the BJT base current amplitude cycle by cycle based on load change.

23 Claims, 5 Drawing Sheets

CONTROLLER FOR SWITCHING POWER CONVERTER DRIVING BJT BASED ON PRIMARY SIDE ADAPTIVE DIGITAL CONTROL

CROSS-REFERENCE TO RELATED APPLICATION

This application claims priority under 35 U.S.C. §119(e) from co-pending U.S. Provisional Patent Application No. 61/140,605, entitled "Controller for Switching Power Converter Driving BJT Based On Primary Side Adaptive Digital Control," filed on Dec. 23, 2008, which is incorporated by reference herein in its entirety.

BACKGROUND OF THE INVENTION

1. Field of the Invention

The present invention relates to a controller for a switching power converter that drives a BJT (Bipolar Junction Transistor) switch.

2. Description of the Related Arts

Achieving low cost and high performance at the same time is a challenge in designing low-power AC/DC power supplies. Compared with conventional secondary-side feedback switching power supplies, primary-side feedback switching power converters offer great cost savings and enhanced reliability by removing components such as opto-couplers and output current sensing resistors. However, conventional controller ICs (Integrated Circuits) used in primary-side feedback switching power converters often use the input line voltage as a parameter in controlling the operation of the switching power converter for output voltage regulation. Thus, these conventional power supply controller ICs typically have a Vin pin that senses the instantaneous line voltage (input voltage) as rectified by rectifier circuitry, adding an extra pin to the controller IC. In addition, sensing the line voltage also requires an analog-to-digital converter (ADC) and its associated circuitry for converting the analog input voltage to digital values that can be used by the digital controller ICs, control logic internal to the controller IC, and a resistive voltage divider external to the controller IC for sampling and feeding the line voltage information to the Vin pin. Such additional pin and extra circuitry add to the die size and manufacturing cost of the controller IC.

Meanwhile, using a BJT as the power switch in the switching power supply has several benefits, including lower cost than power MOSFET's, less EMI (Electro-Magnetic Interference) noise, and eliminating costly and lossy snubber circuitry for low-power designs of 2-3 W. To achieve high performance including high efficiency, however, the driver design for BJT's is more challenging and complicated.

SUMMARY OF THE INVENTION

Embodiments of the present invention include a controller of an AC/DC flyback switching power converter that uses adaptive digital control approaches to control the switching operation of a BJT power switch based on primary-side feedback to regulate the secondary-side constant output voltage and current, without using the input line voltage. Switching-cycle by switching-cycle peak current control and limit are achieved based on the sensed primary-side current rather than the input line voltage in both constant-voltage and constant-current modes of operation of the flyback switching power converter, by means of adaptive digital control. Thus, the controller does not need a separate pin and ADC circuitry for sensing the input line voltage. As a result, the die size and cost of the controller IC may be reduced significantly.

In one embodiment, a switching power converter comprises a transformer coupled between an input voltage and an output of the switching power converter, the transformer including a primary winding coupled to the input voltage and a secondary winding coupled to the output of the switching power converter, a switch coupled to the primary winding of the transformer, current through the primary winding being generated while the switch is turned on and not being generated while the switch is turned off, and a controller configured to generate a control signal to turn on or turn off the switch, the switch being turned on responsive to the control signal being in a first state and the switch being turned off responsive to the control signal being in a second state. The controller is configured to generate the control signal in the second state to turn off the switch, responsive to a sensed signal indicative of current in the primary winding of the transformer exceeding a peak current threshold for peak current switching of the switch. The controller does not receive or use the level of the input line voltage for regulation of output voltage or output current of the switching power converter. The controller is an integrated circuit chip that does not include a separate pin for receiving the input voltage of the switching power converter during normal operation of the switching power converter.

In one embodiment, the switch is a bipolar junction transistor (BJT) switch and the controller directly drives the base terminal of the BJT, dynamically adjusting the BJT base current amplitude switching-cycle by switching-cycle in real time based on the load change. This to ensure that the BJT is always working in an optimal switching condition. The controller may use pulse width modulation (PWM,) pulse frequency modulation (PFM) and/or the combinations of a plurality of PWM and PFM modes to control the switching frequency in both constant voltage (CV) and constant current (CC) operations.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

According to various embodiments of the present invention, a controller of an AC/DC flyback switching power converter uses adaptive digital control approaches to control the switching operation of a BJT switch of the flyback power converter based on primary-side feedback to regulate the secondary-side constant output voltage and current, without using the input line voltage. Switching-cycle by switching-cycle peak current control and limit are achieved based on the sensed primary-side current rather than the input line voltage in both constant-voltage and constant-current operation modes of the switching power converter, by means of adaptive digital control. Thus, the controller IC does not need a separate pin and ADC circuitry for sensing the input line voltage.

Figure 1:
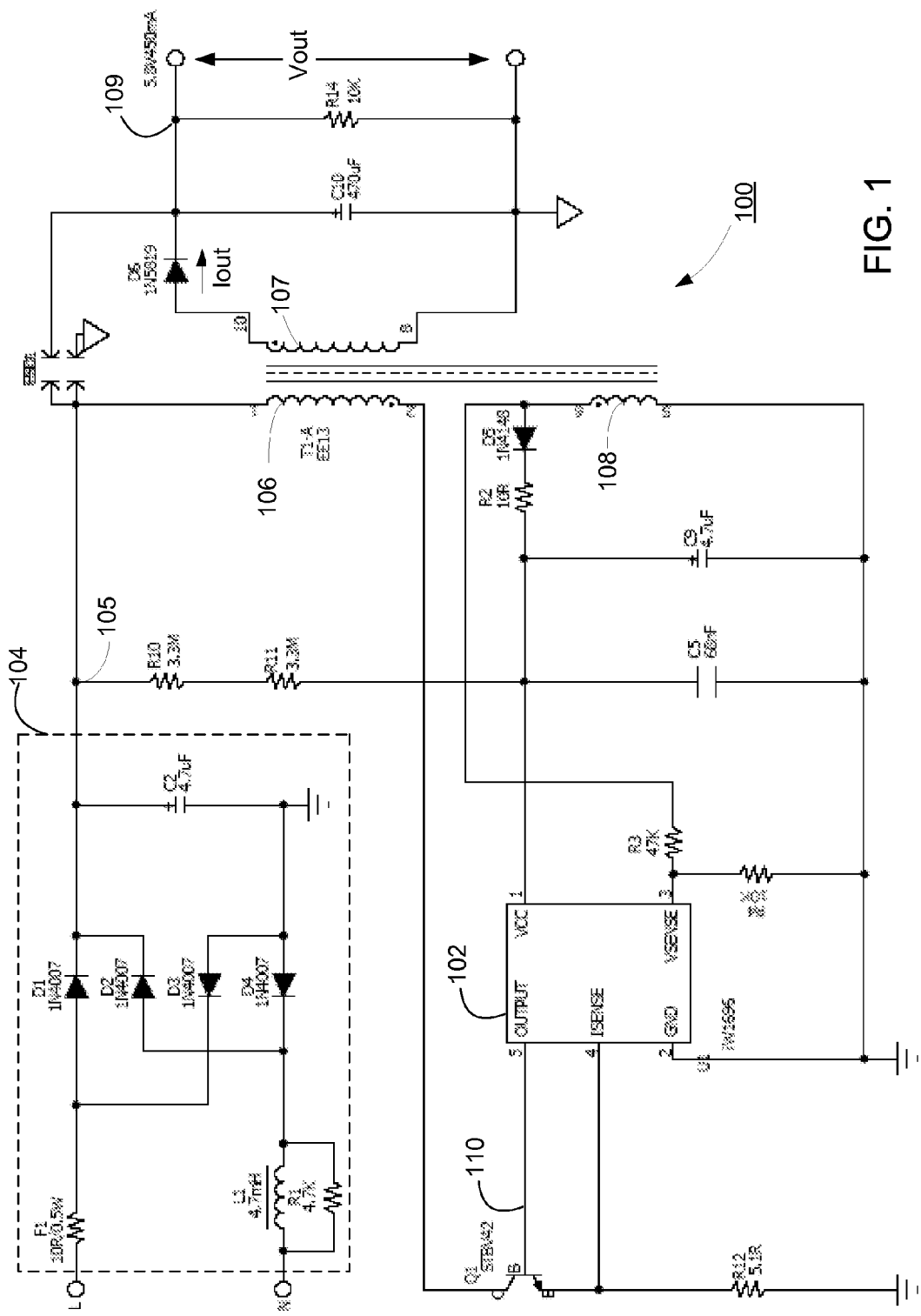
FIG. 1 illustrates an AC to DC flyback switching power converter, according to one embodiment of the present invention.

FIG. 1 illustrates an AC to DC flyback switching power converter, according to one embodiment of the present invention. The power converter 100 includes three principal sections, i.e., a front end, power stage, and a secondary stage. The front end 104 is connected to an AC voltage source (not shown) at nodes L, N, and includes a bridge rectifier comprised of inductor L1, resistors R1, F1, diodes D1, D2, D3, D4, and capacitor C2. The rectified input line voltage at node 105 is input to the supply voltage pin Vcc (pin 1) of controller IC 102 via resistors R10 and R11. The line voltage at node 105 is also coupled to the primary winding 106 of power transformer T1-A. Capacitor C5 removes high frequency noise from the rectified line voltage input to the supply voltage pin Vcc (pin 1). The output of the front end section at node 105 is an unregulated DC input voltage. Note that the supply voltage pin Vcc (pin 1) receives the rectified input line voltage at node 105 merely for use as a supply voltage (Vcc) to the controller IC 102 during start-up of the IC controller 102. As will be explained in more detail below, the rectified input line voltage at node 105 at the Vcc pin (pin 1) is not used by controller IC 102 in determining the level of the input line voltage for regulation of the secondary-side constant output voltage Vout and output current Iout, in constant voltage and constant current operation modes, respectively.

The power stage is comprised of power transformer T1-A, BJT power switch Q1, and controller IC 102. Power transformer T1-A includes a primary winding 106, a secondary winding 107, and an auxiliary winding 108. Controller IC 102 maintains output regulation via control of the ON and OFF states of BJT power switch Q1 via a control signal 110 output from the OUTPUT pin (pin 5) of controller IC 102. Control signal 110 drives the base (B) of BJT power switch Q1. The collector (C) of BJT power switch Q1 is connected to the primary winding 106, while the emitter (E) of BJT power switch Q1 is connected to the ISENSE pin (pin 4) of controller IC 102 and to ground via resistor R12. The ISENSE pin (pin 4) senses the current through the primary winding 106 and BJT switch Q1 in the form of a voltage across sense resistor R12. Controller IC 102 can employ any one of a number of modulation techniques, such as pulse-width-modulation (PWM) or pulse-frequency-modulation (PFM) and/or their combinations, to control the ON and OFF states and duty cycles of BJT power switch 110, as well as the amplitude of the base current of the BJT switch 110. The GND pin (pin 2) of controller IC 102 is connected to ground.

Using a BJT as the power switch in the switching power supply has several benefits. First, BJTs generally have lower cost than power MOSFETs, in particular for high voltage ratings. Meanwhile, BJTs typically have less change rate of voltage or current during switching (i.e., dv/dt and di/dt), allowing for easier EMI (Electro-Magnetic Interference) design. Also, BJTs generally have slow turn off speed, and thus there is no need to use snubbers for low-power designs of 2-3 W, reducing component count and BOM (Bill of Material) cost in the switching power supply as well as eliminating power loss associated with snubber circuits. Also, the BJT switch would be a discrete component external to the controller IC 102, providing a broad choice of components with a possibility to achieve lower overall BOM cost in the switching power converter 100. However, since BJTs are current-driven devices, it is more challenging and complicated to design the driver for driving BJT's used in the switching power supply 100. Also, there are different types of BJT drive circuit topologies. The base-drive topology is used with the controller IC 102, which brings even less dv/dt (change in voltage) and EMI noise than other BJT drive topologies.

The secondary stage is comprised of diode D6 functioning as an output rectifier and capacitor C10 functioning as an output filter. The resulting regulated output voltage Vout at node 109 is delivered to the load (not shown). Resistor R14 is the pre-load that is typically used for stabilizing the output in case of no load conditions of the flyback switching power converter 100. Also, ESD discharge gap (ESD1) is coupled between the primary winding 106 and the cathode of diode D6.

The output voltage Vout at node 109 is reflected across auxiliary winding 108 at node 120, which is input to the VSENSE pin (pin 3) of controller IC 102 via a resistive voltage divider comprised of resistors R3 and R4. Also, although controller IC 102 is powered up by the line voltage 105 at start-up, controller IC 102 is powered up by the voltage across auxiliary winding 108 after start-up and in normal operation. Thus, diode D5 and resistor R2 form a rectifier for rectifying the voltage across auxiliary winding 108 for use as the supply voltage input to the VCC pin (pin 1) of controller IC 102 after start-up during normal operation. Thus, the supply voltage pin Vcc (pin 1) does not receive the line voltage 105 after start-up and controller IC 102 does not use information on the line voltage 105 for regulation of the output voltage or output current. Capacitor C9 is used to hold power from the line voltage at node 105 at start-up or from the voltage across auxiliary winding 108 after start-up between switching cycles.

Figure 2A:
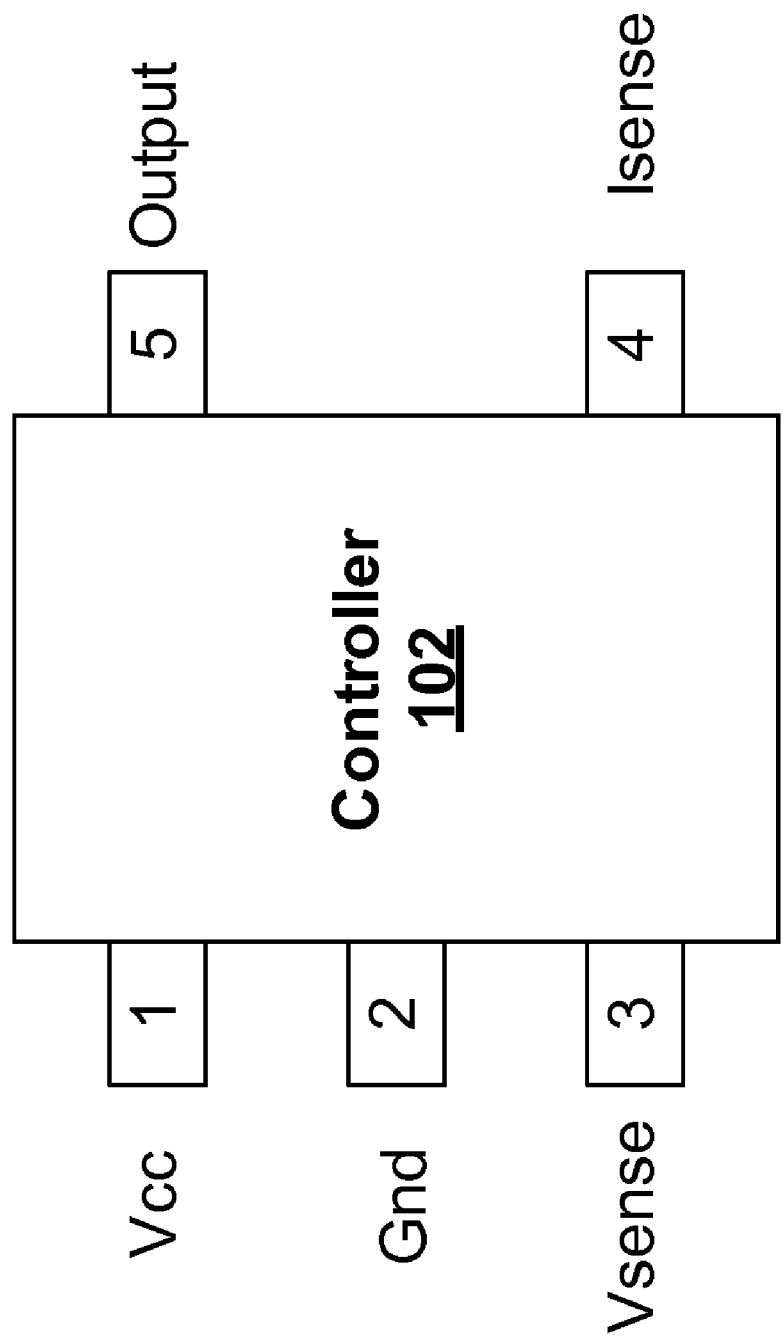
FIG. 2A illustrates the pin-outs of the controller IC of the AC to DC flyback switching power converter, according to one embodiment of the present invention.

FIG. 2A illustrates the pin-outs of the controller IC of the AC to DC flyback switching power converter, according to one embodiment of the present invention. In one embodiment, controller IC 102 is a 5-pin IC. Pin 1 (Vcc) is a power input pin for receiving the supply voltage, pin 2 (Gnd) is a ground pin, pin 3 (Vsense) is an analog input pin configured to receive the voltage across the auxiliary winding 108 of the flyback switching power converter for primary-side regulation of the output voltage Vout, pin 4 (Isense) is an analog input pin configured to sense the primary-side current of the flyback switching power converter in the form of an analog voltage, for cycle-by-cycle peak current control and limit. Pin 5 (Output) is an output pin outputting base drive signal 110 for controlling the on-times and off-times of the BJT power switch Q1 as well as the amplitude of the base current of BJT switch Q1. Supply voltage pin Vcc (pin 1) receives the rectified input line voltage at node 105 merely for use as a supply voltage (Vcc) to the controller IC 102 during start-up of the IC controller 102. The voltage at the supply voltage (Vcc) pin (pin 1) is not used by controller IC 102 in determining the level of the input line voltage for regulation of the secondary-side constant output voltage and current, in constant voltage and constant current operation modes, respectively.

Note that the switch controller IC 102 does not include a Vin pin for sensing the input line voltage (or an Rin pin that is typically included for connection of a resistor for sensing the input line voltage) for using the sensed input line voltage for regulation of the output voltage or output current of the switching power converter 100. Switch controller 102 is configured for direct base drive of the BJT power switch Q1 using output control signal 110 from pin 5 (OUTPUT). Also, switch controller IC 102 does not have an $I_{BC}$ pin typically required in conventional power supply controller ICs driving BJT power switches to set the maximum BJT base current. The $I_{BC}$ pin is not necessary in the switching power supply 100 of FIG. 1, because it is specifically designed for low-power AC/DC applications in which the maximum primary current is within a certain pre-defined range, which makes the external adjustment of maximum BJT base current unnecessary. The removal of $I_{BC}$ pin also brings the possibility of simplifying the internal BJT base driver design.

Figure 2B:
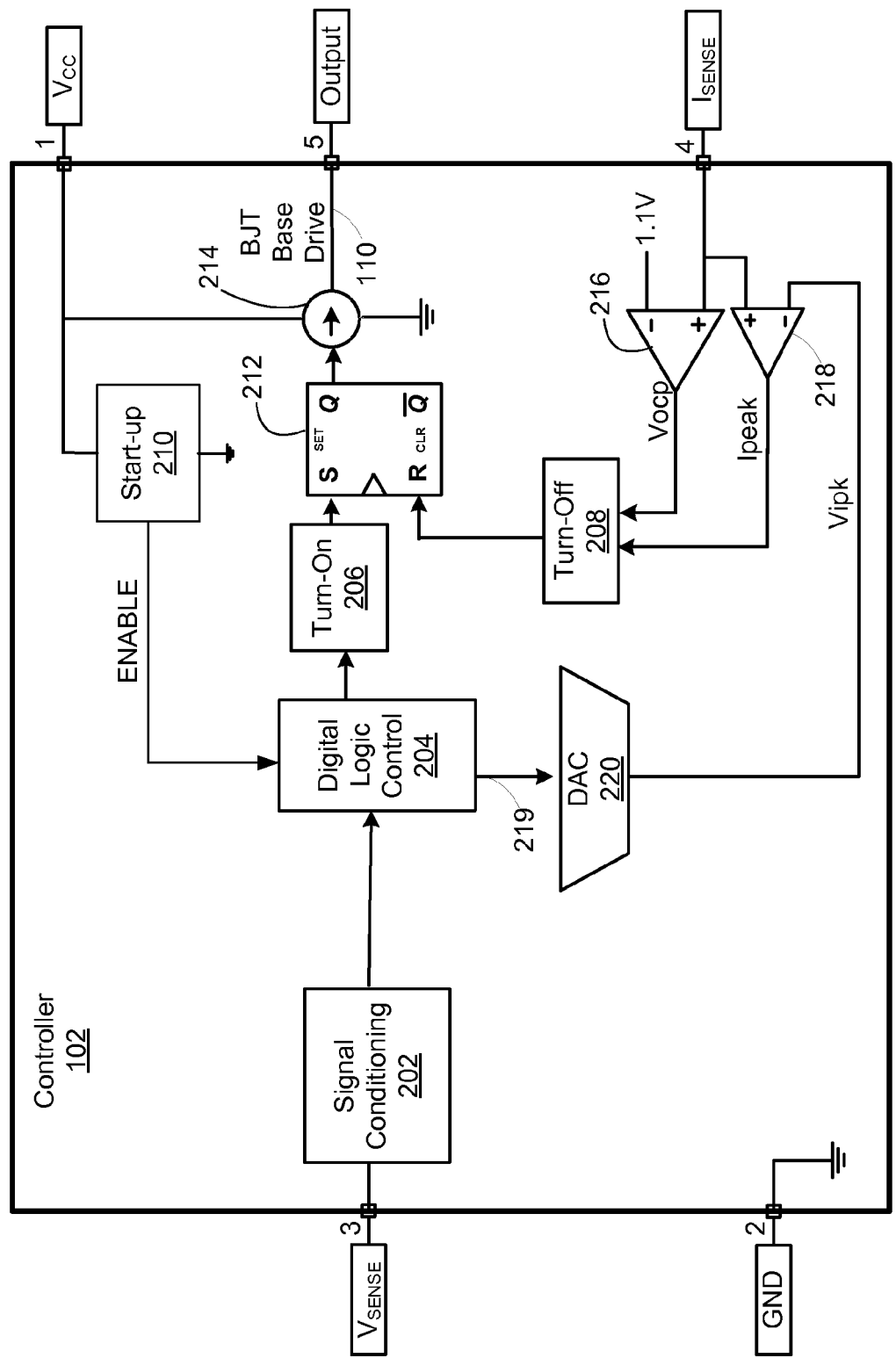
FIG. 2B illustrates the internal circuitry of the controller IC of the AC to DC flyback switching power converter in more detail, according to one embodiment of the present invention.

FIG. 2B illustrates the internal circuitry of the controller IC of the AC to DC flyback switching power converter in more detail, according to one embodiment of the present invention. Controller IC 102 receives analog parameters such as the Vsense voltage at pin 3 and the Isense voltage at pin 4, but adaptively processes these parameters using digital circuitry and digital state machines to generate the appropriate base drive signal at pin 5 (Output). Controller IC 102 includes several main circuit blocks, including start-up block 210, signal conditioning block 202, digital logic control block 204, digital-to-analog converter (DAC) 220, turn-on logic block 206, turn-off logic block 208, SR flip flop 212, Ipeak comparator 218, over-current protection (OCP) comparator 216, and BJT base driver 214. Controller IC 102 regulates the output voltage Vout and output current Iout of the switching power supply 100 by means of adaptive digital, primary-side feedback control. Sensing the primary-side current at the $I_{SENSE}$ pin (pin 4) allows cycle-by-cycle peak current control and limit in both CV (Constant Voltage) mode and CC (Constant Current) mode as well as precise constant current (output current Iout) control that is insensitive to the magnetizing inductance Lm of the transformer T1-A. Sensing the output voltage Vout reflected across the auxiliary winding 108 at the $V_{SENSE}$ pin (pin 3) allows for precise output voltage regulation.

Controller 102 causes switching power supply 100 to operate in true peak-current mode. More specifically, after power up, when the supply voltage $V_{CC}$ voltage is built up to a voltage higher than a predetermined power-on-reset (POR) threshold, an ENABLE signal is generated from start-up block 210. ENABLE signal is sent to digital logic control block 204 that initiates a turn on command. In response, the turn-on logic block 206 sets SR flip flop 212, causing BJT base drive current generator 214 to generate a base drive current 110 via the OUTPUT pin (pin 5) to turn on the BJT power switch Q1. Controller IC 102 then receives feedback information on the output voltage Vout as reflected on auxiliary winding 108 via the $V_{SENSE}$ pin (pin 3).

Signal conditioning block 202 receives the Vsense voltage and generates a variety of voltage and current feedback parameters for use by digital logic control block 204. Signal conditioning block 202 generates a variety of voltage feedback information, such as a digital feedback voltage value $V_{FB}$. $V_{FB}$ is a digital value representative of the Vsense voltage sampled at the end of the transformer reset time in each switching cycle, scaled to a comparable level for comparison with a reference voltage $V_{REF}$. $V_{REF}$ is also a digital value representative of the target regulated output voltage (e.g., 5V) of the switching power converter, scaled to a lower value (e.g., 1.538 V) according to the turns ratio between the secondary winding 107 and the auxiliary winding 108 and the resistive voltage divider (R3/(R3+R4)). Thus, the specific value of the reference voltage $V_{REF}$ is determined according to the target regulated output voltage of the switching power converter. As to current feedback, signal conditioning block 202 derives secondary current timing information such as Tp (switching period of the switching cycles of switching power converter 100) and Trst (transformer reset time) based on the Vsense voltage sampled at pin 3 and provides such secondary timing information to digital logic control block 204. The voltage feedback values and current feedback values, including $V_{FB}$, Tp, and Trst, may be determined using one of a variety of conventional techniques.

Figure 2C:
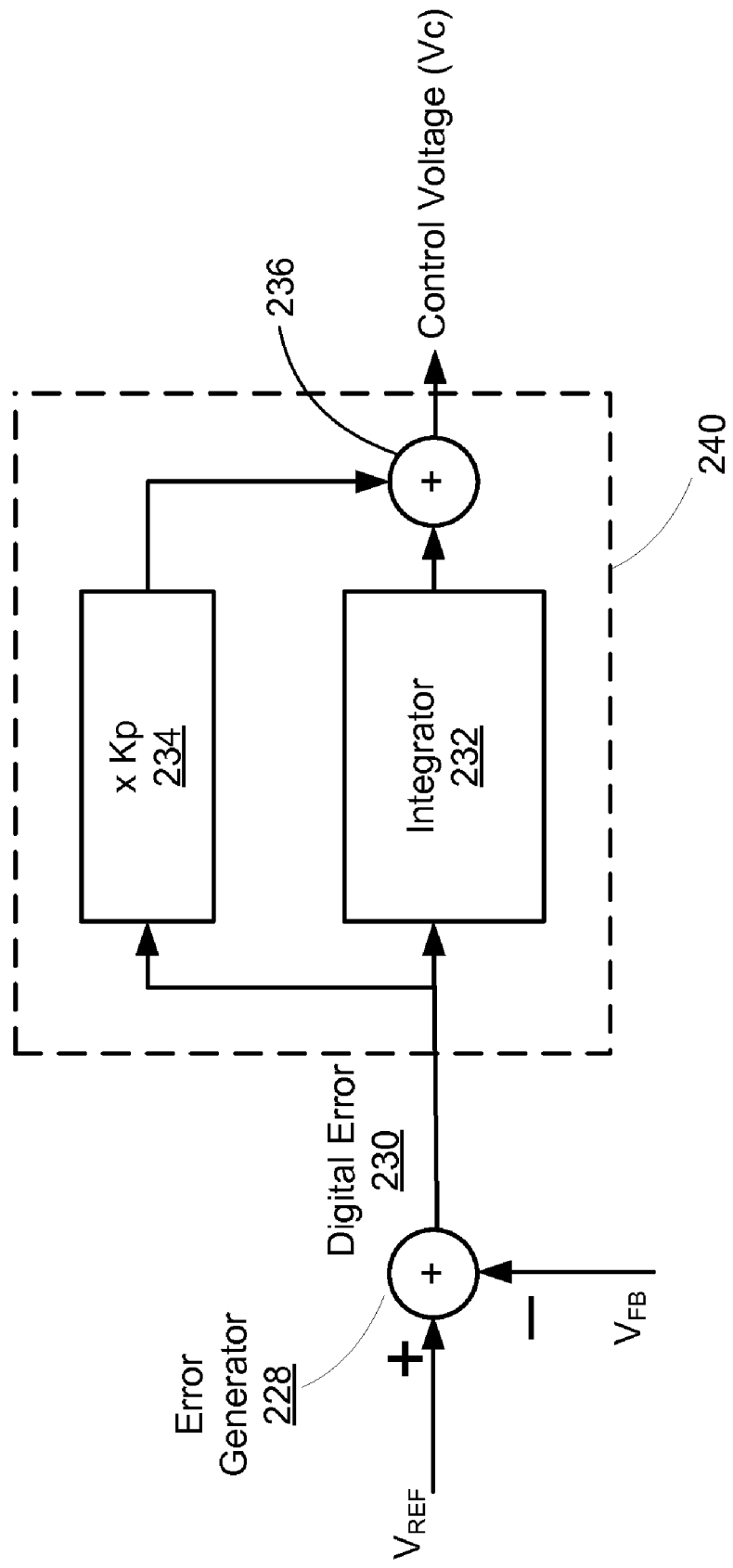
FIG. 2C illustrates an example of circuitry inside the digital logic control block of the controller IC of the AC to DC flyback switching power converter, according to one embodiment of the present invention.

FIG. 2C illustrates an example of circuitry inside digital logic control block 204 that uses the voltage and current feedback parameters provided by signal conditioning block 202 to generate a control voltage Vc. Inside the digital logic control block 204 is a digital error generator 228 that determines the difference between digital voltage feedback value $V_{FB}$ and the digital reference voltage value $V_{REF}$. The resulting digital error signal 230 is input to a P-I function (proportional-integral function) 240 comprised of an integrator 232 and a proportional block 234. Integrator 232 integrates digital error signal 230 over a predetermined number of switching cycles, whose output is added to a scaled value (scaled by coefficient Kp in proportional block 234) of the digital error signal 230 in adder 236 to generate control voltage Vc 236. Control voltage Vc 236 indicates the extent of power supply loading, i.e., how much energy has to be transferred to the load per switching cycle in order to maintain the required output voltage, so that the digital error signal 230 is maintained zero. In general, a high control voltage Vc indicates that the output current is lower than desired and should be increased. Although FIG. 2C illustrates a digital implementation of generating the control voltage Vc, other analog implementations can be used to generate a similar parameter reflecting the extent of power supply loading.

Referring back to FIG. 2B, the control voltage Vc and the Tp and Trst information are used to calculate an appropriate digital value 219 of Vipk to be used as the peak threshold value for peak current mode switching. If error signal 230 indicates that the output voltage Vout is lower than desired, then control voltage Vc will be increased by P-I function 240, causing the on-time of the BJT switch Q1 to increase and thereby transfer more energy to the load per switching cycle to maintain the required output regulation voltage. If error signal 230 indicates that the output voltage Vout is higher than desired, then the control voltage Vc will be decreased by P-I function 240, causing the on-time of the BJT switch Q1 to decrease and thereby transfer less energy to the load per switching cycle to maintain the required output regulation voltage. Also, digital logic control block 204 includes a digital state machine (not shown) determining the proper operation mode under which switching power supply 100 should operate. This digital state machine adaptively selects either pulse width modulation (PWM) or pulse frequency modulation (PFM) for control of switching frequency, and either constant voltage (CV) mode or constant current (CC) mode for output regulation. Using Vc, Tp, Trst in the selected operation mode (PWM or PFM, and CV mode or CC mode), digital logic control block 204 generates an appropriate digital input signal 219, which is converted to an analog peak current mode threshold voltage Vipk for peak current mode switching. Vipk is input to comparator 218 and compared with the $I_{SENSE}$ voltage indicative of the primary side current through BJT power switch Q1 in switching power converter 100. Once the $I_{SENSE}$ pin voltage reaches the peak current mode threshold voltage Vipk, the output Ipeak of comparator 218 is set to high, causing turn-off block 208 to reset SR flip flop 212. In response, BJT base driver circuit 214 turn off BJT power switch Q1.

Digital logic control block 204 determines when to turn on the BJT power switch Q1 based on the selected PWM mode or PFM mode. Instead of outputting a constant amplitude of base current throughout the entire operational range, the controller IC 102 dynamically adjusts the amplitude of the BJT base current 110, switching-cycle by switching-cycle in real time based on the load change. This dynamic BJT base current control is achieved via the digital logic control block 204. Based on the determined peak current threshold Vipk information, digital logic control block 204 can predict the maximum BJT collector current (since $I_{SENSE}$ is limited to Vipk) and determine how much base current is needed in BJT power switch Q1, without entering an over-drive or under-drive condition. Together with the Tp, Trst timing information and the determined base current information, digital logic control block 204 can turn on the BJT power switch Q1 with dynamic base drive control. In this manner, the BJT switch Q1 operates in an optimal switching condition in the entire power supply operational range, generating low switching and conduction losses and therefore high efficiency. After the BJT switch Q1 is turned on and the transformer primary current is built up, the $I_{SENSE}$ pin voltage increases since the sense resistor R12 (see FIG. 1) is connected from the BJT Q1 emitter to ground and the emitter is connected to the $I_{SENSE}$ pin. As explained above, BJT base driver 214 turns off BJT power switch once $I_{SENSE}$ pin voltage reaches the threshold voltage Vipk. Thus, digital logic control block 204 also controls the turning off of BJT power switch Q1 through peak current mode switching by setting the threshold voltage Vipk.

For safety and reliability, controller IC 102 also includes over-current protection (OCP) comparator 216. Once the $I_{SENSE}$ pin voltage reaches an OCP threshold (e.g., 1.1 V in the example of FIG. 2B), the output Vocp of comparator 216 is set to high, causing turn-off block 208 to reset SR flip flop 212. In response, BJT base driver 214 turns off BJT power switch Q1. Thus, no matter what operation conditions or operation mode the switching power supply 100 is operating in, the BJT base driver 214 is turned off immediately for safety reasons. Other safety measures may also be provided in controller 102, such as a mechanism to protect the power supply 100 if resistor R12 is shorted or to turn off the BJT base driver 214 when a fault occurs, which is not shown herein.

As shown in FIG. 2B, controller 102 achieves peak current mode switching in switching power converter 100 based on the $I_{SENSE}$ pin voltage by means of adaptive digital control, without separately sensing the input line voltage Vin. In other words, the controller 102 according to the present invention uses the Isense pin voltage as a proxy for the input line voltage Vin. This is possible because the slope of increase of the primary current $I_p$ through switch Q1 (represented by the Isense voltage) is substantially proportional to the input line voltage, through the relationship Vin=Lm (d$I_p$/dt), where Lm is the magnetizing inductance of the primary winding 106 of transformer T1-A. Controller 102 uses the Isense voltage (representing the primary current $I_p$) as a proxy for the line voltage Vin in CV mode. Controller 102 can also use the Isense voltage (representing the primary current $I_p$) in CC mode to maintain a constant, regulated output current from the switching power converter 100, for example, as explained in U.S. Pat. No. 7,443,700 issued to Yan et al. on Oct. 28, 2008 and assigned to iWatt Inc., which is incorporated by reference herein in its entirety.

Because the line voltage Vin is not necessary in controller IC 102, Vin and Rin pins typically found in conventional power supply controller ICs are not needed in controller 102 of the present invention. Also, controller IC 102 does not need an ADC circuit for converting the input line voltage to a digital value or other circuits associated with sensing the Vin line voltage. This brings substantial savings in die size and cost of fabricating the controller IC 102.

Figure 3:
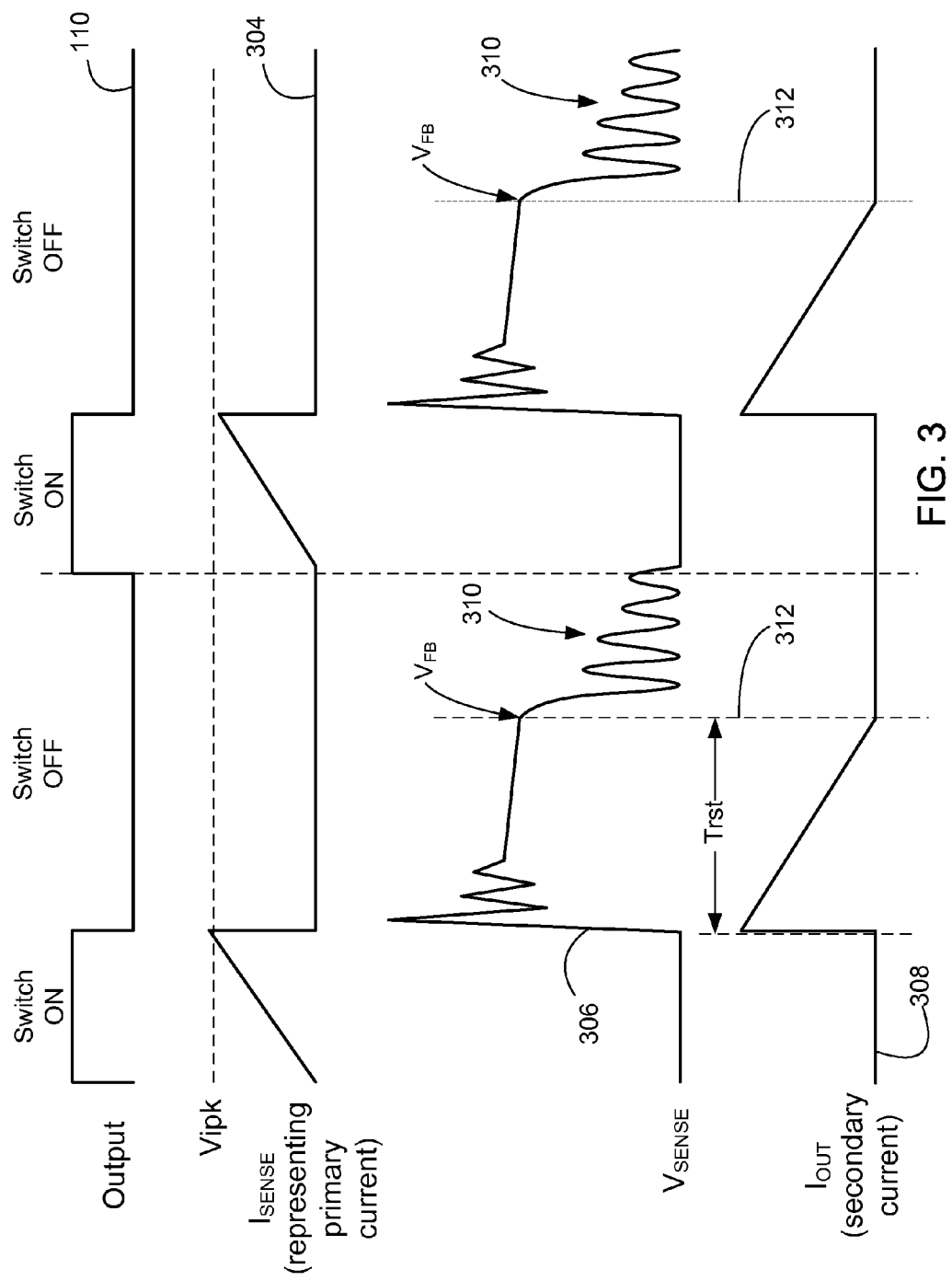
FIG. 3 illustrates the operational waveforms of the flyback switching power converter of FIG. 1.

FIG. 3 illustrates the operational waveforms of the flyback switching power converter of FIG. 1. Referring to FIG. 3 together with FIG. 1, controller 102 outputs a control signal 110 (OUTPUT, in current form), which defines the ON and OFF states of BJT power switch Q1 as well as the amplitude of the base current of BJT power switch Q1. The primary current $I_p$ through BJT power switch Q1 and primary winding 106 is represented as the voltage Isense 304. When control signal 110 is high and thus power switch Q1 is in the ON state, primary current (represented by Isense) 304 ramps up. The rate of ramp up of primary current (Isense) 304 is predominantly based on the input line voltage at node 105 and the magnetizing inductance Lm of primary winding 106. When power switch Q1 is in the ON state, output rectifier diode D6 is reversed biased, and thus $V_{SENSE}$ voltage 306 (representing the output voltage Vout) is zero and output current (secondary current) $I_{OUT}$ 308 is also equal to 0 A. Thus, while power switch Q1 is in the ON state, energy is stored in power transformer T1-A but not delivered to the load at the output.

When primary current (Isense) 304 reaches the peak current mode threshold Vipk, control signal 110 becomes 0 volt (low) and the power switch Q1 is switched to the OFF state. As a result, output rectifier diode D6 becomes forward biased, and energy stored in power transformer T-1A is delivered to the secondary side of power transformer T-1A based on the turns ratio between the primary winding 106 and the secondary winding 107. As the energy stored in power transformer T1-A is delivered to the secondary stage, secondary current $I_{OUT}$ 308 spikes up and then starts to ramp down. Similarly, the Vsense voltage 306 also spikes up and then slowly ramps down. When all of the energy stored in power transformer T1-A is delivered to the secondary stage, secondary current $I_{OUT}$ 308 becomes equal to 0 A, which point is also referred to as the transformer reset point 312. The period Trst is also referred to as the transformer reset time. Note that the feedback voltage $V_{FB}$ (explained above with reference to FIG. 2C) is sampled from Vsense at the transformer reset point 312, as shown in FIG. 3. If power switch Q1 remains in the OFF state beyond the transformer reset point 312, the Vsense voltage exhibits high frequency ringing, generally occurring during voltage ringing period 310, with the amplitude of ringing decaying over time. Then, controller IC 102 will determine the next turn-on time of power switch Q1 based on the selected operation mode (PWM or PFM and CV mode or CC mode) and generate a high output control signal 110 to turn on the power switch Q1 for the next switching cycle, and the above described operation is repeated in the next switching cycle and subsequent switching cycles.

The system architecture of the controller of the present invention enables building a primary feedback digital controller with low cost while still achieving high performance Only 5 pins are needed in the controller IC 102, removing the input line voltage and configured for direct base drive of a BJT power switch, thereby reducing the cost for fabricating the controller IC. The use of a BJT switch Q1 not only reduces the power device cost, but also simplifies EMI filter design and removes the costly and lossy snubber circuits for low-power power supply designs. As shown in FIG. 1, the entire power supply in a power range of 2-3 W can be built with just 23 components, significantly reducing the cost for building the overall switching power supply. Meanwhile, the dynamic BJT base current control and the operation of PWM, PFM and their appropriate combinations achieve high performance including high efficiency and low EMI.

Upon reading this disclosure, those of skill in the art will appreciate still additional alternative designs for switching power converters. For example, the power supply application circuit in FIG. 1, the pin names in FIG. 2A, and the internal circuitry in FIG. 2B are provided merely for illustration and may be modified. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A switching power converter comprising:
   a transformer coupled between an input voltage and an output of the switching power converter, the transformer including a primary winding coupled to the input voltage and a secondary winding coupled to the output of the switching power converter;
   a switch coupled to the primary winding of the transformer, current through the primary winding being generated while the switch is turned on and not being generated while the switch is turned off; and
   a controller configured to generate a control signal to turn on or turn off the switch, the switch being turned on responsive to the control signal being in a first state and the switch being turned off responsive to the control signal being in a second state,
   wherein the controller is further configured to generate the control signal in the second state to turn off the switch responsive to a sensed signal indicative of the current through the primary winding exceeding a peak current threshold for peak current switching of the switching power converter, wherein a slope of increase of the sensed signal indicative of the current through the primary winding is substantially proportional to the input voltage to the switching power converter and is a proxy for the input voltage.

2. The switching power converter of claim 1, wherein the controller does not receive or use a level of the input voltage in regulation of output voltage or output current of the switching power converter.

3. The switching power converter of claim 1, wherein the controller is an integrated circuit chip that does not include a separate pin for receiving the input voltage of the switching power converter during normal operation of the switching power converter.

4. The switching power converter of claim 1, wherein the controller is an integrated circuit chip with five pins, the five pins including a first pin for receiving a supply voltage for the controller, a second pin for connection to ground, a third pin for receiving a voltage signal indicative of a scaled down output voltage of the switching power converter, a fourth pin for receiving the sensed signal indicative of current in the primary winding, and a fifth pin for outputting the control signal to turn on or turn off the switch.

5. The switching power converter of claim 1, wherein the sensed signal is a voltage measured across a resistor through which the current in the primary winding flows.

6. The switching power converter of claim 1, wherein the switch is a bipolar junction transistor, the control signal directly drives a base terminal of the bipolar junction transistor to provide a base current in the bipolar junction transistor, and the controller dynamically adjusts an amplitude of the base current switching-cycle by switching-cycle based on change in a load of the switching power converter.

7. The switching power converter of claim 1, wherein the controller includes a peak current comparator for comparing the sensed signal with the peak current threshold.

8. The switching power converter of claim 1, wherein the controller is further configured to generate the control signal in the second state to turn off the switch responsive to the sensed signal indicative of current in the primary winding of the transformer exceeding a predetermined voltage indicative of an over-current condition.

9. The switching power converter of claim 1, wherein the switching power converter does not include an analog-to-digital converter for converting the input voltage to a digital value for use by the controller in regulation of output voltage or output current of the switching power converter.

10. The switching power converter of claim 1, wherein the switching power converter is a primary-side feedback, flyback-type switching power converter.

11. A switching power converter comprising:
    a transformer coupled between an input voltage and an output of the switching power converter, the transformer including a primary winding coupled to the input voltage and a secondary winding coupled to the output of the switching power converter;
    a switch coupled to the primary winding of the transformer, current through the primary winding being generated while the switch is turned on and not being generated while the switch is turned off; and
    a controller configured to generate a control signal to turn on or turn off the switch, the switch being turned on responsive to the control signal being in a first state and the switch being turned off responsive to the control signal being in a second state,
    wherein the controller does not receive the input voltage for regulation of output voltage or output current of the switching power converter and uses a slope of increase of a sensed signal indicative of the current through the primary winding as a proxy for the input voltage.

12. The switching power converter of claim 11, wherein the controller is an integrated circuit chip that does not include a separate pin for receiving the input voltage of the switching power converter during normal operation of the switching power converter.

13. The switching power converter of claim 11, wherein the controller is an integrated circuit chip with five pins, the five pins including a first pin for receiving a supply voltage for the controller, a second pin for connection to ground, a third pin for receiving a voltage signal indicative of a scaled down output voltage of the switching power converter, a fourth pin for receiving the sensed signal indicative of current in the primary winding, and a fifth pin for outputting the control signal to turn on or turn off the switch.

14. The switching power converter of claim 11, wherein the switch is a bipolar junction transistor, the control signal directly drives a base terminal of the bipolar junction transistor to provide a base current in the bipolar junction transistor, and the controller dynamically adjusts an amplitude of the base current switching-cycle by switching-cycle based on change in a load of the switching power converter.

15. The switching power converter of claim 11, wherein the switching power converter does not include an analog-to-digital converter for converting the input voltage to a digital value for use by the controller for regulation of the output voltage or the output current of the switching power converter.

16. The switching power converter of claim 11, wherein the switching power converter is a primary-side feedback, flyback-type switching power converter.

17. In a controller, a method of controlling a switching power converter, the switching power converter including a transformer coupled between an input voltage and an output of the switching power converter, the transformer including a primary winding coupled to the input voltage and a secondary winding coupled to the output of the switching power converter, and a switch coupled to the primary winding of the transformer, current through the primary winding being generated while the switch is turned on and not being generated while the switch is turned off, the method comprising:

generating a control signal to turn on the switch, the switch being turned on responsive to the control signal being in a first state; and generating the control signal in a second state to turn off the switch, responsive to a sensed signal indicative of the current in the primary winding of the transformer exceeding a peak current threshold for peak current switching of the switching power converter, wherein a slope of increase of the sensed signal indicative of the current through the primary winding is substantially proportional to the input voltage to the switching power converter and is a proxy for the input voltage.

18. The method of claim 17, wherein a level of the input voltage is not received or used by the controller for regulation of output voltage or output current of the switching power converter.

19. The method of claim 17, wherein the sensed signal is a voltage measured across a resistor through which the current in the primary winding of the transformer flows.

20. The method of claim 17, further comprising generating the control signal in a second state to turn off the switch, responsive to a sensed signal indicative of current in the primary winding of the transformer exceeding a predetermined voltage indicative of an over-current condition.

21. The method of claim 17, wherein a slope of increase of the sensed signal indicative of the current in the primary winding is substantially proportional to the input voltage to the switching power converter.

22. The method of claim 17, wherein the switch is a bipolar junction transistor, the control signal directly drives a base terminal of the bipolar junction transistor to provide a base current in the bipolar junction transistor, and the controller dynamically adjusts an amplitude of the base current switching-cycle by switching-cycle based on change in a load of the switching power converter.

23. The method of claim 17, wherein the switching power converter is a primary-side feedback, flyback-type switching power converter.

* * * * *